United States Patent [19]

Boudot et al.

[11] Patent Number: 4,540,672

[45] Date of Patent: Sep. 10, 1985

[54] GLASSES OF LOW DENSITY AND HIGH INDEX OF REFRACTION FOR OPHTHALMIC AND OPTICAL APPLICATIONS

[75] Inventors: Jean E. Boudot; Jean P. Mazeau; Michel Prassas, all of Avon, France

[73] Assignee: Corning Glass Works, Corning, N.Y.

[21] Appl. No.: 635,493

[22] Filed: Jul. 30, 1984

Related U.S. Application Data

[63] Continuation-in-part of Ser. No. 607,517, May 7, 1984, abandoned.

[30] Foreign Application Priority Data

Aug. 2, 1983 [FR] France .................. 83 12693

[51] Int. Cl.³ .............................. C03C 3/08
[52] U.S. Cl. ........................ 501/65; 501/64; 501/66; 501/67; 501/903
[58] Field of Search .............. 501/64, 65, 66, 67, 501/903

[56] References Cited

U.S. PATENT DOCUMENTS 2,523,265  9/1950  Armistead .................. 501/903
2,699,399  1/1955  Armistead .................. 501/903
4,438,211  3/1984  Mennemann et al. ........ 501/903

FOREIGN PATENT DOCUMENTS 54-105119  8/1979  Japan ........................ 501/903

Primary Examiner—Mark L. Bell
Attorney, Agent, or Firm—C. S. Janes, Jr.

[57] ABSTRACT

This invention relates to glasses especially suitable for optical and ophthalmic applications which exhibit densities less than about 2.65 g/cm³, refractive indices between about 1.595–1.607, and Abbe numbers between about 40–47, and which consist essentially, in weight percent on the oxide basis, of

| | | | |
|---|---|---|---|
| $SiO_2$ | 45–55 | MgO and/or BaO and/or SrO and/or $La_2O_3$ | 0–6 |
| $B_2O_3$ | 5–13 | | |
| $Al_2O_3$ | 0–5 | CaO | 0–12 |
| $Li_2O$ | 1–7.5 | ZnO | 0–8 |
| $Na_2O$ | 1–9 | $ZrO_2$ | 0–7 |
| $K_2O$ | >10–24 | $TiO_2$ | 9.5–17.5 |
| | | $As_2O_3$ and/or $Sb_2O_3$ | 0–1 |
| and $13.5 < TiO_2 + ZrO_2 + La_2O_3 + MgO + CaO + BaO + ZnO + SrO$ | | | <23.5 |

4 Claims, No Drawings

GLASSES OF LOW DENSITY AND HIGH INDEX OF REFRACTION FOR OPHTHALMIC AND OPTICAL APPLICATIONS

This application is a continuation-in-part of Ser. No. 607,517, filed May 7, 1984 and now abandoned.

BACKGROUND OF THE INVENTION

The present invention concerns glasses of low density for optical and ophthalmic use.

The utilization of glasses with high indices of refraction in comparison to conventional glasses ($n_d = 1.523$) permits, at the same power, a reduction of the thickness of the edge (negative power) or of the center of the lens (positive power). However, an increase in the index of refraction leads in a general way to a decrease in the Abbe number (that is to say, an increase in the dispersion of the glass). If the dispersion is too high, the chromatic aberration then becomes significant and causes the appearance of colored fringes at the edges of the lens. To palliate this defect, the glass must have a high Abbe number.

One other not negligible advantage associated with variations in thickness is lighter weight and this throughout the whole range of corrections, with the exception of very small corrections. For that reason, it is critical that the density of the glass not be too high; one particularly prefers that it be lower than about 2.65 g/cc.

These characteristics will considerably improve the aesthetic appearance of the lens and offer greater comfort to the wearer of the lenses.

SUMMARY OF THE INVENTION

The present invention provides the possibility of continuously producing a lightweight glass destined for use in ophthalmic lenses and in optics. In order to assure continuous production with the usual means of forming (pressing), the proposed glasses exhibit a liquidus temperature that is below 1000° C. and have a viscosity at this temperature of a few hundred poises.

The base glass system, according to the present invention, is a potassium, titanium borosilicate ($K_2O$-$TiO_2$-$B_2O_3$-$SiO_2$). This system was chosen for its good stability against devitrification when compared with lithium or sodium borosilicates. The principal ingredient destined to raise the index of refraction is $TiO_2$.

With the same object in view, it is also possible to envisage the addition of other oxides to the base system such as: MgO, CaO, BaO, SrO, ZnO, $ZrO_2$, and $La_2O_3$. Nevertheless, in order to maintain as low a density as possible, the utilization of these oxides will be undertaken only under certain conditions described below.

The glass will also contain other alkali metal oxides such as $Li_2O$ and $Na_2O$. Outside of their small contribution to the density, their addition to the base system confers greater flexibility in the choice of composition exhibiting good physical and chemical properties.

The inventive glasses are characterized by an index of refraction between about 1.595–1.607, an Abbe number between about 40–47, and a density less than about 2.65 g/cm³. Their transmission in the visible (400 mm) for a thickness of 10 mm is greater than about 83%. Moreover, they exhibit excellent chemical durability (A.O. test).

According to the present invention, the ranges of oxides composing glasses with the above-mentioned properties consist essentially, in weight percent on the oxide basis, of:

| | | | |
|---|---|---|---|
| $SiO_2$ | 45–55 | MgO and/or BaO | |
| $B_2O_3$ | 5–13 | and/or SrO and/or $La_2O_3$ | 0–6 |
| $Al_2O_3$ | 0–5 | CaO | 0–12 |
| $Li_2O$ | 1–7.5 | ZnO | 0–8 |
| $Na_2O$ | 1–9 | $ZrO_2$ | 0–7 |
| $K_2O$ | >10–24 | $TiO_2$ | 9.5–17.5 |
| | | $As_2O_3$ and/or $Sb_2O_3$ | 0–1 |

The ranges of proportions mentioned above for the glass constituents are very important for obtaining the physical and chemical properties required for the application envisaged. More particularly, the $SiO_2$ content will comprise between 45–55% by weight. This range is imposed by the choice of the other components of the glass whose limiting amounts are given in the following paragraphs.

$B_2O_3$ is an essential constituent in the glass composition. Its principal advantages are a small contribution to the density accompanied with a decrease in the viscosity when it is added in substitution for $SiO_2$. The influence of $B_2O_3$ on the viscosity and, consequently, on the facility of melting and forming the glass, also contributes to a glass exhibiting very little coloration. Therefore, the glass will contain at least 5% by weight. Beyond 13% $B_2O_3$ the $SiO_2$ content must be reduced in order to maintain the properties, which unfavorably affects the stability of the glass against devitrification.

$Al_2O_3$ increases the viscosity of the glass, improves its chemical durability, but, in return, it rapidly deteriorates the resistance of the glass to devitrification. Hence, its amount will not be greater than 5% by weight.

Among the alkali metal oxides, $K_2O$ is the one that gives rise to compositions exhibiting a great stability against devitrification. This oxide, when it is added in place of $SiO_2$, not only decreases the density, but also the index of refraction. It can be introduced into the glass up to 24% by weight. Beyond this limit compensation of the refractive index will be effected either with a substantial drop in Abbe number (compensation with $TiO_2$) or with an increase of density (compensation with alkaline earth metal oxides). $K_2O$ can be substituted in part by equivalent oxides such as $Li_2O$ and $Na_2O$. Nevertheless, as previously pointed out, high quantities of the latter facilitate devitrification of the glass. Hence, the glass will contain more than 10% by weight $K_2O$.

$Li_2O$ is the most favorable alkali metal oxide for refractive index. Nevertheless, added in large amounts it reduces the viscosity of the glass and increases its tendency for devitrification. Therefore, its concentration will not exceed 7.5% by weight.

$Na_2O$ is utilized in the same manner as $Li_2O$, but is less favorable for density and refractive index. It can be tolerated with respect to devitrification in greater amounts than $Li_2O$. Its content must be no greater than 9% by weight.

Generally, a combination of three oxides $Li_2O$, $Na_2O$, and $K_2O$ will be preferred. In this case their sum will satisfy the following condition:

$$15\% \leq Li_2O + Na_2O + K_2O \leq 24.5\%$$

$TiO_2$ is the constituent which offers the best compromise between density and refractive index. Used in great amount, however, it reduces the visible transmission, facilitates devitrification, increases the density, and rapidly decreases the Abbe number. Therefore, a minimum of 9.5% $TiO_2$ is required, but no more than about 17.5% can be tolerated.

In like manner, $ZrO_2$ increases the refractive index and density of the glass, but reduces the Abbe number less rapidly than $TiO_2$. Also, this oxide improves the alkali durability of the glass. Therefore, the preferred glasses contain at least 1% $ZrO_2$. Its amount will be limited to 7% by weight because, beyond that, crystallization becomes significant.

Among other oxides, MgO, BaO, SrO, and $La_2O_3$ can be introduced up to 6% by weight, whereas CaO and ZnO can be up to 12% and 8%, respectively. It will be understood these limits comprise maxima when only one of these oxides is added to the glass. These oxides increase the density and refractive index. To maintain the index, their addition must be effected with a reduction in the amount of $TiO_2$. This has the effect of rapidly raising the Abbe number. However, because of their great contribution to the density, they will be utilized only in a limited manner.

CaO and ZnO will be preferred to MgO for reasons of devitrification and to BaO and SrO for reasons of density. CaO will be the oxide preferably used for glasses of high Abbe number.

In order to have the physical properties ($n_d$, $V_d$, density) in the indicated ranges, the condition specified below must be satisfied.

$$13.5 \leq TiO_2 + ZrO_2 + La_2O_3 + RO \leq 23.5 \text{ (weight \%)}$$

with R being selected from the group of Mg, Ca, Ba, Zn, and Sr.

For the same reason, other oxides such as $Nb_2O_5$, $Gd_2O_3$, $Ta_2O_5$, and $Y_2O_3$ can be added in small quantity to the composition. By reason of their prohibitive cost, the glass will preferably not contain them.

Finally, for better fining the glass, one has recourse to the usual fining agents such as $As_2O_3$ and $Sb_2O_3$. In order to avoid excessive coloration of the glass, their content will be less than 1% by weight.

For glasses having a refractive index between about 1.595 and 1.607, a density less than or equal to about 2.65 g/cm$^3$, and an Abbe number between about 40–47, the glass constituents will preferably be in the ranges specified below:

| $SiO_2$ | 50–55 | CaO | 0–8 |
|---|---|---|---|
| $B_2O_3$ | 7.5–12 | $ZrO_2$ | 0–3 |
| $Al_2O_3$ | 0–2 | $TiO_2$ | 9.5–17 |
| $Li_2O$ | 2–7.5 | MgO, BaO, SrO, ZnO, $La_2O_3$ | 0 |
| $Na_2O$ | 1–4 | $TiO_2 + ZrO_2 + $ CaO | 15–22 |
| $K_2O$ | >10–16 | $As_2O_3$ | 0–0.6 |
| $Li_2O + Na_2O + K_2O$ | 17–23 | | |

PRIOR ART

U.S. Pat. No. 2,901,365 disclosed glasses having densities less than 2.7 g/cm$^3$, preferably 2.55–2.65 g/cm$^3$, and refractive indices between 1.56–1.58. The glasses consisted essentially, in weight percent, of

| $SiO_2$ | 58–64 | CaO + MgO | 7.5–14 |
|---|---|---|---|
| $Na_2O$ | 0–17.5 | $TiO_2$ | 5–9 |
| $K_2O$ | 0–15.5 | $B_2O_3$ | 0–10 |
| $Li_2O$ | 0–5 | $Al_2O_3$ | 0–3 |
| $Na_2O + K_2O + Li_2O$ | 12.5–17.5 | | |

Although not specified in detail, the Abbe numbers of the working examples ranged from 48.4–53.2.

The $SiO_2$ and $TiO_2$ contents are outside the ranges of the present inventive glasses, and $Li_2O$ and $Na_2O$ are optional rather than required components.

Great Britain Patent Application No. 2,115,403 A discloses ophthalmic and optical glasses demonstrating refractive indices >1.56, Abbe numbers >40, and densities <2.7 g/cm$^3$ consisting essentially, in weight percent of:

| $SiO_2$ | 47–75 | CaO | 0–20 |
|---|---|---|---|
| $B_2O_3$ | 1–20 | MgO | 0–15 |
| $Al_2O_3$ | 0–10 | SrO | 0–4 |
| $P_2O_5$ | 0–5 | BaO | 0–4 |
| $SiO_2 + B_2O_3 + Al_2O_3 + P_2O_5$ | 57–85 | ZnO | 0–5 |
| $Li_2O$ | 0–15 | $TiO_2$ | 1–15 |
| $Na_2O$ | 0–10 | $ZrO_2$ | 0–8 |
| $K_2O$ | 0–10 | $Nb_2O_5$ | 0–5 |
| $Li_2O + Na_2O + K_2O$ | 5–17 | F | 0–5 |

The $K_2O$ content is outside the range of the present inventive glasses, and $Li_2O$ and $Na_2O$ are optional rather than required components.

DESCRIPTION OF PREFERRED EMBODIMENTS

The invention is illustrated through the non-limiting examples in the table below. The preferred examples are Nos. 3 and 7.

EXAMPLE OF A GLASS MELT

The various constituents of the glass are provided by the batch materials specified below:

| Oxides | Batch Materials |
|---|---|
| $SiO_2$ | $SiO_2$ |
| $B_2O_3$ | $B(OH)_3$ |
| $Al_2O_3$ | $Al(OH)_3$ |
| $Li_2O$ | $Li_2CO_3$ |
| $Na_2O$ | $Na_2CO_3$, $NaNO_3$ |
| $K_2O$ | $K_2CO_3$, $KNO_3$ |
| MgO | $MgCO_3$ |
| CaO | $CaCO_3$ |
| BaO | $BaCO_3$ |
| SrO | $SrCO_3$ |
| ZnO | ZnO |
| $La_2O_3$ | $La_2O_3$ |
| $ZrO_2$ | $ZrO_2$ |
| $TiO_2$ | $TiO_2$ |
| $As_2O_3$ | $As_2O_3$ |
| $Sb_2O_3$ | $Sb_2O_3$ |

The batch materials chosen preferably contain a minimum amount of $Fe_2O_3$ in order to obtain a glass as "white" as possible.

After weighing, the various batch materials are mixed according to current techniques. The batch is then charged into a platinum crucible at a temperature of about 1100° C. When it is completely melted, the temperature of the batch is brought to about 1300°–1400° C. and maintained for about 2–5 hours for homogenization and fining. The bath of glass is thereafter cooled to a temperature corresponding to the viscosity adequate for forming and cooling in steel molds.

MEASUREMENTS OF PHYSICAL AND CHEMICAL PROPERTIES OF GLASSES

Measurements of refractive index and Abbe number are effected according to usual methods (for $n_d$, the yellow line of He is utilized) on annealed samples. Density is measured by the immersion method and expressed in g/cm$^3$.

Chemical resistance is evaluated by the A.O. test described in the journal *Applied Optics*, 7, No. 5, page 847, May, 1968. It consists in determining the loss in weight of a polished sample immersed at 25° C. for 10 minutes in a 10% by weight HCl aqueous solution. The loss in weight is expressed in mg/cm$^2$.

The liquidus temperature is determined with the aid of a furnace with a thermal gradient. The treatment is of 17 hours' duration with the presence of crystals being detected through observation with an optical microscope.

A rotation viscosimeter was utilized for the determination of high temperature viscosity (in poises).

The transmission of the glass at 400 mm is determined on polished samples of 10 mm thickness with the aid of a CARY-14 spectrophotometer.

TABLE

|  | 1 | 2 | 3 | 4 | 5 | 6 | 7 | 8 | 9 | 10 |
|---|---|---|---|---|---|---|---|---|---|---|
| SiO$_2$ | 51.4 | 53.1 | 54.4 | 53.33 | 54.4 | 54.1 | 54.4 | 46 | 54.6 | 50.4 |
| B$_2$O$_3$ | 11.9 | 7.9 | 7.9 | 8.24 | 7.7 | 7.9 | 7.9 | 5.4 | 8.9 | 8.4 |
| Al$_2$O$_3$ | 0.5 | — | 0.5 | — | — | 0.5 | 0.5 | 4.0 | — | — |
| Li$_2$O | 2.2 | 2.5 | 4.2 | 5.1 | 5.2 | 4.2 | 6.5 | 1.0 | 4.7 | 6.2 |
| Na$_2$O | 2.5 | 8.0 | 2.5 | 1.96 | 2.0 | 2.5 | 1.5 | 2.0 | 1.0 | 1.5 |
| K$_2$O | 14.4 | 11.7 | 13.7 | 12.55 | 11.0 | 15.2 | 10.3 | 21.2 | 11.5 | 12.0 |
| CaO | 2.2 | 2.5 | — |  |  |  | 6.0 | 3.9 | 6.0 | 12.0 |
| MgO |  |  |  | — | 6.0 | — |  |  |  |  |
| ZrO$_2$ | — | — | 1.0 | 6.86 | — | — | 1.0 | — | 1.0 | — |
| TiO$_2$ | 14.6 | 14.0 | 15.5 | 11.96 | 13.7 | 15.3 | 11.9 | 16.5 | 12.0 | 9.5 |
| As$_2$O$_3$ | 0.3 | 0.3 | 0.3 | — | — | 0.3 | — | — | 0.3 | — |
| $n_d$ (60° C./hr.) | 1.6004 | 1.5993 | 1.6040 | 1.6055 | 1.5989 | 1.5963 | 1.6030 | 1.6003 | 1.5998 | 1.5996 |
| $V_d$ (60° C./hr.) | 41.5 | 42.4 | 41.0 | 42.8 | 42.8 | 42.1 | 44.4 | 41.0 | 44.4 | 47.0 |
| Density | 2.60 | 2.63 | 2.61 | 2.64 | 2.59 | 2.60 | 2.62 | 2.63 | 2.62 | 2.64 |
| A.O. (mg/cm$^2$) | — | — | 0.013 | — | — | 0.013 | 0.010 | 0.012 | 0.009 | 0.011 |
| Transmission | — | — | 86.3 | — | — | 85.8 | 87.3 | 87.1 | 87.2 | 87.0 |
| Liquidus (°C.) | ~915 | <875 | ~895 | ~955 | ~945 | ~890 | ~945 | ~980 | ~980 | ~980 |
| Liquidus Viscosity | — | — | ~1350 | — | — | ~1100 | ~390 | — | — | — |

We claim:

1. A glass for ophthalmic and optical use having a refractive index between about 1.595–1.607, a density less than or equal to about 2.65 g/cm$^3$, and an Abbe number between about 40–47, consisting essentially, in weight percent on the oxide basis, of:

| SiO$_2$ | 50–55 | Li$_2$O + Na$_2$O + K$_2$O | 17–23 |
|---|---|---|---|
| B$_2$O$_3$ | 7.5–12 | CaO | 0–8 |
| Al$_2$O$_3$ | 0–2 | ZrO$_2$ | 0–3 |
| Li$_2$O | 2–7.5 | TiO$_2$ | 9.5–17 |
| Na$_2$O | 1–4 | CaO + ZrO$_2$ + TiO$_2$ | 15–22 |
| K$_2$O | >10–16 | As$_2$O$_3$ | 0–0.6 |
|  |  | MgO + BaO + SrO + ZnO + La$_2$O$_3$ | 0 |

2. A glass according to claim 1 characterized in that said composition contains at least 1% ZrO$_2$.

3. A glass according to claim 1 of a density about 2.61 g/cm$^3$, a refractive index about 1.6040, and an Abbe number about 41 characterized by the following composition:

| SiO$_2$ | 54.4 | K$_2$O | 13.7 |
|---|---|---|---|
| B$_2$O$_3$ | 7.9 | ZrO$_2$ | 1.0 |
| Al$_2$O$_3$ | 0.5 | TiO$_2$ | 15.5 |
| Li$_2$O | 4.2 | As$_2$O$_3$ | 0.3 |
| Na$_2$O | 2.5 |  |  |

4. A glass according to claim 1 of a density about 2.62 g/cm$^3$, a refractive index about 1.6030, and an Abbe number about 44.4 characterized by the following compositions:

| SiO$_2$ | 54.4 | K$_2$O | 10.3 |
|---|---|---|---|
| B$_2$O$_3$ | 7.9 | CaO | 6.0 |
| Al$_2$O$_3$ | 0.5 | ZrO$_2$ | 1.0 |
| Li$_2$O | 6.5 | TiO$_2$ | 11.9 |
| Na$_2$O | 1.5 |  |  |

* * * * *